United States Patent
Jensen et al.

(10) Patent No.: US 11,971,067 B2
(45) Date of Patent: Apr. 30, 2024

(54) COUPLING DEVICE

(71) Applicant: Scaffco Holding A/S, Trige (DK)

(72) Inventors: Mads Bekhøj Jensen, Egå (DK); Tobias Bekhøj Halvorsen, Trige (DK)

(73) Assignee: SCAFFCO HOLDING A/S, Trige (DK)

( * ) Notice: Subject to any disclaimer, the term of this patent is extended or adjusted under 35 U.S.C. 154(b) by 0 days.

(21) Appl. No.: 17/718,726

(22) Filed: Apr. 12, 2022

(65) Prior Publication Data
US 2022/0333629 A1    Oct. 20, 2022

(30) Foreign Application Priority Data

Apr. 20, 2021 (DK) ............................ PA 2021 70180

(51) Int. Cl.

| | |
|---|---|
| *F16B 7/04* | (2006.01) |
| *E04C 3/04* | (2006.01) |
| *E04G 7/30* | (2006.01) |
| *E04G 7/34* | (2006.01) |
| *E04H 15/34* | (2006.01) |

(52) U.S. Cl.
CPC ................ *F16B 7/044* (2013.01); *E04C 3/04* (2013.01); *E04G 7/301* (2013.01); *E04G 7/34* (2013.01); *E04H 15/34* (2013.01)

(58) Field of Classification Search
CPC ..... E04B 2001/2409; E04B 2001/2457; E04B 2001/2692; E04B 2001/2616; E04C 3/04; F16B 7/044; F16B 7/0486
See application file for complete search history.

(56) References Cited

U.S. PATENT DOCUMENTS

| | | | |
|---|---|---|---|
| 3,760,550 A |   | 9/1973 | Mueller et al. |
| 4,449,335 A | * | 5/1984 | Fahey .................. E04B 1/2612 52/713 |
| 4,503,651 A | * | 3/1985 | Pugh ........................ E04C 3/17 52/639 |
| 4,974,987 A |   | 12/1990 | Smock |

(Continued)

FOREIGN PATENT DOCUMENTS

| | | | | |
|---|---|---|---|---|
| CA | 2796340 A1 | * | 1/2013 | ........... E04B 1/2604 |
| EP | 1811094 A1 |   | 7/2007 | |

(Continued)

*Primary Examiner* — Christine T Cajilig
(74) *Attorney, Agent, or Firm* — Schmeiser, Olsen & Watts, LLP

(57) ABSTRACT

A coupling device suitable for interconnecting two beam ends is provided, wherein the beam with the beam end has an elongate axis, where on a first beam end is arranged first interconnection units having two first parallel flange elements arranged with a mutual first distance x, wherein in each flange is designed a cut-out with a cross-section in the plane of the flange; a second beam end is arranged a second interconnection unit having a second flange, the width of the second flange across the plane of the second flange is smaller than or equal to x, and where largely perpendicular to the plane of the second flange, a connecting element protrudes on each side of the second flange, the cross-section of the connecting element in the plane of the second flange allows insertion of the connecting element into the cut-outs of the first flanges on the first beam end.

9 Claims, 3 Drawing Sheets

(56) References Cited

U.S. PATENT DOCUMENTS

| | | | | |
|---|---|---|---|---|
| 8,850,774 | B2* | 10/2014 | Kempf | E04B 1/2403 |
| | | | | 52/646 |
| 10,907,376 | B1* | 2/2021 | Bonilla | E04H 12/342 |
| 2004/0046162 | A1 | 3/2004 | Zhu | |
| 2011/0142591 | A1* | 6/2011 | Kempf | E05D 11/06 |
| | | | | 414/815 |
| 2013/0192653 | A1* | 8/2013 | Watson | E04H 15/48 |
| | | | | 135/139 |
| 2020/0354948 | A1 | 11/2020 | Berdichevsky | |

FOREIGN PATENT DOCUMENTS

| | | |
|---|---|---|
| EP | 3352158 A1 | 7/2018 |
| GB | 2 002 841 A | 2/1979 |

\* cited by examiner

COUPLING DEVICE

CROSS-REFERENCE TO RELATED APPLICATIONS

This application claims priority to Danish Patent Application No. PA 2021 70180, having a filing date of Apr. 20, 2021, the entire contents of which are hereby incorporated by reference.

FIELD OF TECHNOLOGY

The following relates to a coupling device suitable for interconnecting two beam ends. The following further describes a method of using the coupling device to interconnect two beam ends.

BACKGROUND

In many contexts, it may be desirable to couple beam ends, for example, in connection with the construction of coverings, tents, scaffolding and the like, where logistics conditions prevent the beams from being transported, handled and mounted at full length. Specifically in connection with manual handling, it is often desirable for the beams to have a relatively small dimension, thereby allowing the personnel building the covering, scaffolding, tent or the like, to manually handle the beams without the use of cranes and the like, which inconvenience and slow the work.

For larger scaffolding or covering structures, lattice beams are often used, such beams having the advantage of achieving a relatively high moment of inertia relative to the dead weight. The moment of inertia expresses how much the beam bends under load, and it is therefore desirable to have as high a moment of inertia as possible, thus making the beam as rigid as possible. To assemble several beam elements into one combined beam, a number of assemblies are required, and various systems exist in the industry for assembling beam ends. All these systems involve either relatively intensive work in connection with the fitting and screwing together of bolts, or cause assemblies that are not particularly rigid, thereby making the finished beam very loose, with an inherent risk of causing large deflections and fluctuations during use.

Therefore, there is a need to be able to provide an assembly between beam ends which is both easy in connection with assembly, i.e., it creates a fixed assembly between opposing beam ends, it comprises simple means and can be handled in a straightforward, fast and simple way.

SUMMARY

An aspect relates to a coupling device suitable for interconnecting two beam ends, wherein the beam with the beam end has an elongate axis, where on
- a first beam end is arranged first interconnection units consisting of two first parallel flange elements arranged with a mutual first distance x, wherein the flanges are arranged symmetrically on either side of a plane parallel to the elongated axis of the beam, and wherein the plane of each flange is parallel to the longitudinal direction of the beam, and that in each flange is designed a cut-out with a cross-section in the plane of the flange;
- a second beam end is arranged a second interconnection unit consisting of a second flange with the plane of the second flange in the longitudinal direction of the beam, wherein the width of the second flange across the plane of the second flange is smaller than or equal to x, and where substantially perpendicular to the plane of the second flange, a connecting element protrudes on each side of the second flange, wherein the cross-section of the connecting element in the plane of the second flange allows insertion of the connecting element into the cut-outs of the first flanges on the first beam end.

By making a cut-out in this way in one beam end and making a connecting element adapted to the cut-out on the second beam end, it is achieved that when assembling the beams ends, the connecting element must be inserted into the cut-out, whereafter the two parts are locked firmly together.

In an embodiment, the connecting element in cross-section is parallel to the second flange and has an oval or elliptical cross-section with a first longitudinal axis a and a shorter width axis b, and wherein the cut-outs in the first flanges have a dimension corresponding to the short width axis b, so that when the connecting element is inserted into the cut-outs, the connecting element will be retained in the cut-outs.

This embodiment is particularly advantageous in that the asymmetric design of the connecting element means that by inserting the connecting element with the smallest dimension through the opening of the cut-out and then rotating the connecting element, for example by rotating the beam end, the change in the dimension will ensure a secure locking of the two interconnection units, providing an especially good assembly.

However, it should be stressed in this connection that the connecting element may have other cross-sectional shapes that make it suitable for being connected, as described above, with the second beam end. For example, circular, rectangular, square or another suitable polygon shape.

In an embodiment of the invention of the coupling device, when the two beam ends with coupling devices arranged on abutting ends are assembled, the connecting element inserted into the cut-out will releasably lock the two ends together.

In an embodiment that is especially applicable to tent structures and scaffolding structures, the beam with the beams ends as well as the flanges are designed in metal, including steel or aluminium, and wherein the flanges are welded or bolted to the beam end.

In an embodiment, the invention discloses a beam section made as a lattice work beam, having an upper longitudinal sub-beam member and a lower longitudinal sub-beam member, where a first end of the upper longitudinal sub-beam member is provided with a first beam end according to claim 1 and the opposite end of the upper longitudinal sub-beam member is provided with a second beam end according to claim 1.

And further a beam section wherein the lower longitudinal beam members ends are provided with flanges extending in the longitudinal direction of the lower longitudinal beam, where the flanges are provided with apertures, such that in use when beam sections are assembled into longer beams the apertures in two adjacent beam ends may be overlapped and a bolt inserted through the overlapping apertures, connecting two adjacent beam sections.

And still further that the beam section has a plurality of lattice members, fastened between the upper longitudinal sub-beam member and the lower longitudinal sub-beam member.

A plurality of such beam sections may be assembled to a long, rigid and strong beam, due to the inventive assembly principle.

Embodiments of the invention further relate to a method of assembling two beam ends, wherein the novel features of the coupling devices are specially utilized by rotating the two beams mounted with coupling devices relative to each other, so that the smallest dimension of the connecting element may be inserted into the cut-out, whereafter, when the longitudinal axis of the beams are aligned in a straight line, thereby rotating the connecting element, the two coupling devices are locked together, thus providing a very strong and stable assembly.

BRIEF DESCRIPTION

Some of the embodiments will be described in detail, with references to the following Figures, wherein like designations denote like members, wherein.

DETAILED DESCRIPTION

Figure 1:
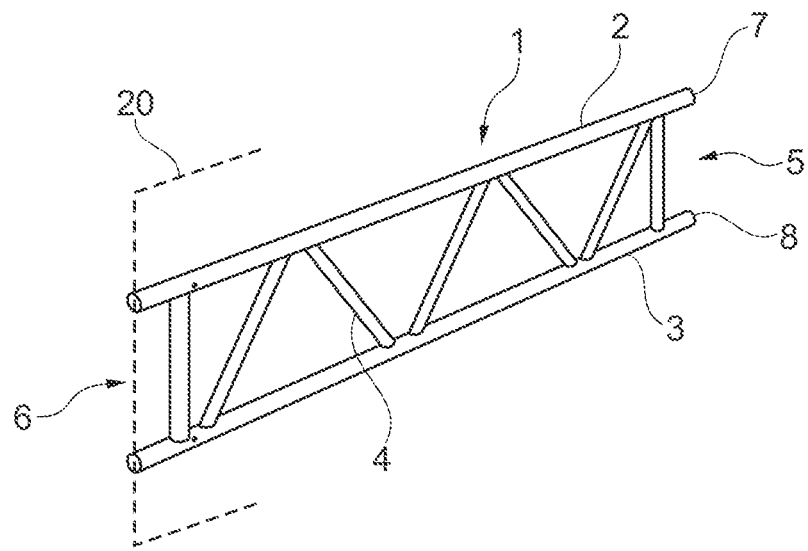
FIG. 1 illustrates a typical lattice beam.

FIG. 1 illustrates a typical lattice beam 1, consisting of an upper beam part 2 and a lower beam part 3 (also referred to as upper and lower longitudinal sub-beam members), between which struts or lattices 4 are arranged. In this way, a lightweight beam is constructed, which, due to its design with a relatively large distance between the upper and lower parts 2, 3, has a very large load-bearing capacity. The lattice beam 1 is provided with beam ends 5, 6, where, in the case shown, there will be an upper beam end 7 and a lower beam end 8. In the following, embodiments of the invention will be described with reference to an assembly device for assembly/coupling of two beam ends, and in the case of lattice beams, this should be understood as the upper beam ends 7, because in this part loads will arise in a lattice beam of the type depicted or in beams in general. In connection with interconnections, other mechanisms may be used to hold abutting beam ends 8 together on the lower beam end.

It should be understood that embodiments of the present invention are also applicable to beam structures other than lattice beams, embodiments of the invention being generally applicable where it is desired to assemble two beam elements into a larger beam by interconnecting, for which the coupling device as defined in the appended claims may be applicable and provide an easy, strong and stable interconnection.

Figure 2:
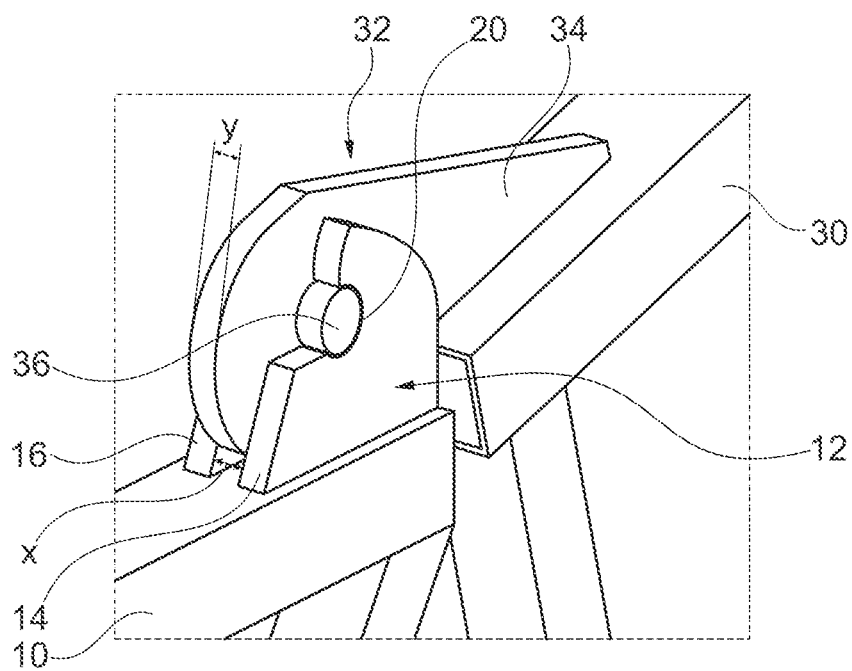
FIG. 2 illustrates a detail of the coupling device.

FIG. 2 illustrates a detail of the coupling device, wherein on a first beam end 10, first interconnection units 12 are arranged, consisting of two first parallel flanges 14, 16 arranged with a mutual first distance x. The flanges 14, 16 are arranged symmetrically about a plane arranged radially to the axis of the beam. For example with reference to FIG. 1, (in use) there will be a vertical plane as indicated by the dotted line 20. The flanges 14, 16 will thus be arranged symmetrically about this plane. Furthermore, in each flange 14, 16 is designed a cut-out 20 with a cross-section in the plane of the flange. The cross-section may vary so that the cut-out itself has different geometries, but in this case, the cut-out, as will be further described with reference to FIG. 5, has a cross-sectional profile which, at least on part of the circumference of the cut-out, has an elliptical or oval shape.

A second beam end 30 is arranged with a second interconnection unit 32, consisting of a second flange 34. This second flange 34 is similarly arranged in the plane of the second beam end, corresponding to the plane of the first beam end. The width y of the flange 34 is smaller than or equal to the width x, i.e., the distance between the two flanges 14, 16 on the first beam end 10, so that the second flange 34 fits into the space between the two flanges 14, 16 when the beam ends 10, 30 are assembled.

Furthermore, the second flange 34 is provided with a connecting element 36 protruding largely perpendicularly from the plane of the second flange 34 on both sides of the flange 34. The protruding connecting element 36 has a geometry, so that when the coupling device is assembled, i.e., when the second flange 34 is fitted into the space x between the flanges 14, 16 on the first beam end, the connecting element 36 will fit into the cut-out so that the cut-out, at least for part of the connecting element, encloses the circumference thereof.

Figure 4:
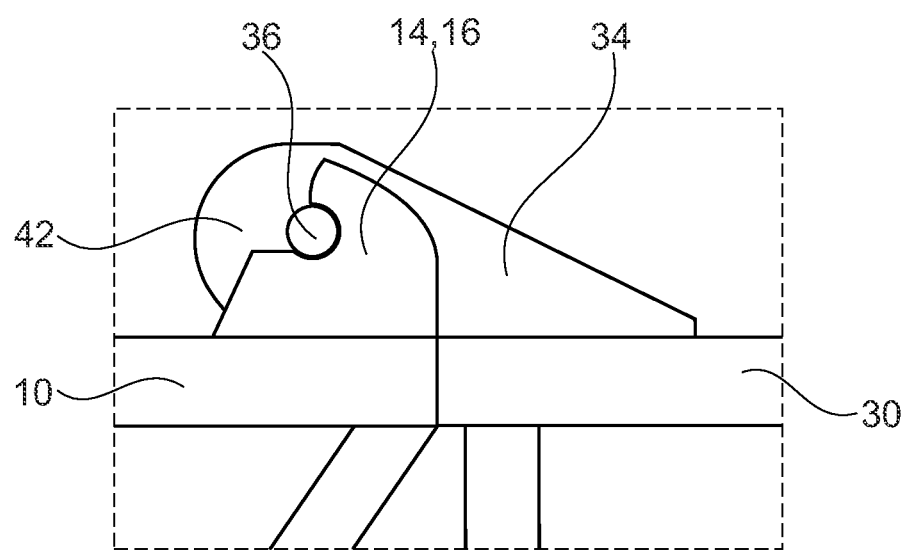
FIG. 4 illustrates the beams ends rotated relative to each other.
Figure 5:
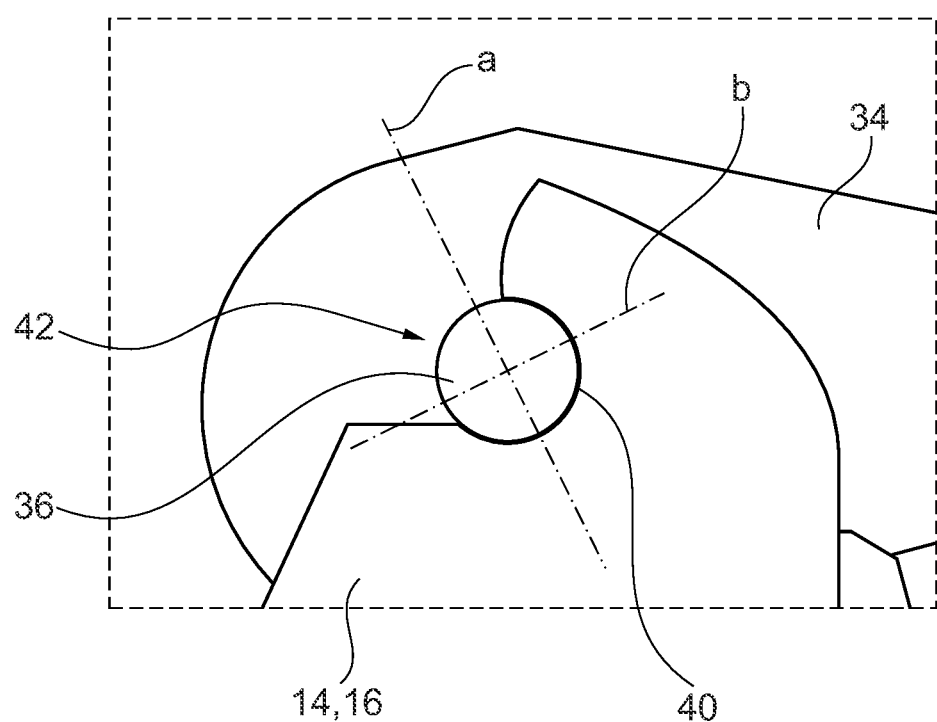
FIG. 5 illustrates an example of an assembly detail on a coupling device of embodiments of the invention.

With reference to FIG. 5, an example is shown of an assembly detail on a coupling device according to embodiments of the invention. In this embodiment, the connecting element 36 is designed with a cross-section corresponding to an oval or elliptical shape. This means that the connecting element 36 has a greater extent along a first longitudinal axis a relative to the extent of the connecting element 36 along a shorter width axis b. Similarly, the cut-out in the flanges 14, 16 is designed so that the circumference 40 of the cut-out is sized and designed to receive the connecting element and, as will be apparent from the explanation for FIGS. 3 and 4, the connecting element is received by way of the long axis of the connecting element being rotatable relative to the locked position, so that the opening 42 of the cut-out may be made comparatively smaller. When the connecting element 36 is then inserted into the cut-out opening 42, where the short axis d is dimensioning, the connecting element may be rotated so that, in this case, the long axis a is rotated clockwise, thereby bringing the circumference of the connecting element in close contact with the circumference 40 of the cut-out, and the cut-out opening 42 will similarly thereafter be partially blocked due to the extent of the connecting element 36 in the direction of the longitudinal axis a, whereby a self-locking effect has occurred.

Figure 3:
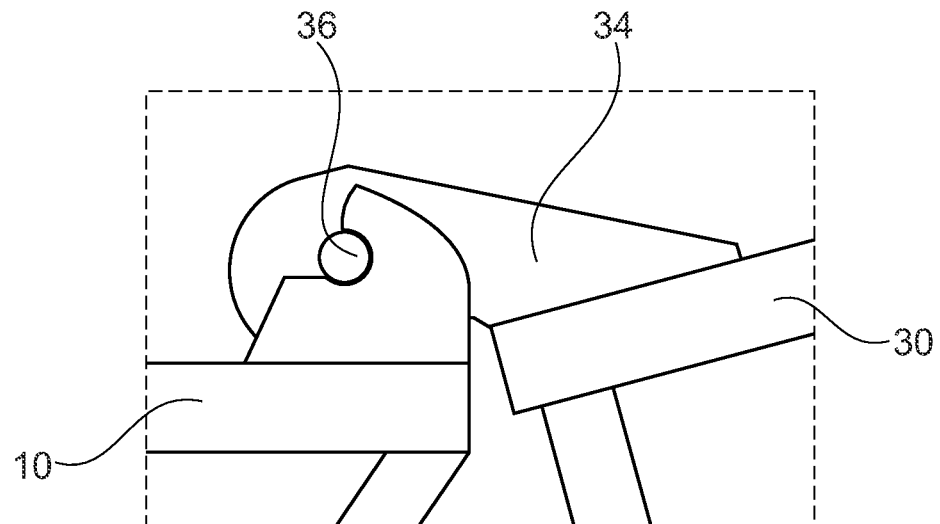
FIG. 3 illustrates the beams ends rotated relative to each other.

When assembling two beam ends, what will typically happen, as illustrated in FIGS. 3 and 4, is that the beam ends 10, 30 are rotated relative to each other, whereby the connecting element 36 may be inserted into the cut-out 20. In this case, the opening of the cut-out is smaller than the extension of the connecting element in the a-axis (see FIG. 5), so that when the connecting element, which is fixed on the flange 34, is rotated together with the beam end 30 to a position as illustrated in FIG. 4, the connecting element will be twisted into place in the cut-out with a self-locking effect, whereby the connecting element 36, as is apparent from FIG. 4, cannot be removed from the cut-out opening 42. In this way, a stable, fixed and secure connection has been established between the two beam ends 10, 30, which can be separated again by rotating the beam ends relative to each other, as illustrated and described above with reference to FIG. 3.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A coupling device suitable for interconnecting two respective beam ends of respective beams, wherein the respective beams each have an elongate axis, where on
   a first beam end is arranged first interconnection units consisting of two first parallel flange elements arranged with a mutual first distance x, wherein the flanges are arranged symmetrically on either side of a plane parallel to the elongated axis of the respective beam, and wherein the plane of each flange is parallel to the longitudinal direction of the respective beam, and that in each flange is configured a cut-out with a cross-section in the plane of the flange; and
   a second beam end is arranged a second interconnection unit consisting of a second flange with the plane of the second flange in the longitudinal direction of the respective beam, wherein the width of the second flange across the plane of the second flange is smaller than or equal to x, and where substantially perpendicular to the plane of the second flange, a connecting element protrudes on each side of the second flange, wherein the cross-section of the connecting element in the plane of the second flange allows insertion of the connecting element into the cut-outs of the first flanges on the first beam end.

2. The coupling device according to claim 1, wherein the connecting element in a cross-section parallel to the second flange has an oval or elliptical cross-section with a first longitudinal axis a and a shorter width axis b, and wherein the cut-outs in the first flanges have a dimension corresponding to the short width axis b, so that when the connecting element is inserted into the cut-outs, the connecting element will be retained in the cut-outs.

3. The coupling device according to claim 1, wherein when two respective beams with coupling devices arranged on abutting ends are assembled, the connecting element inserted into the cut-out will releasably lock the two respective beam ends together.

4. The coupling device according to claim 1, wherein the respective beams with the two respective beam ends as well as the flanges are made in metal, and wherein the flanges are welded or bolted to the respective beam end.

5. A beam section made as a lattice work beam, having an upper longitudinal sub-beam member and a lower longitudinal sub-beam member, where a first end of the upper longitudinal sub-beam member is provided with a first beam end whereon is arranged first interconnection units consisting of two first parallel flange elements arranged with a mutual first distance x, wherein the flanges are arranged symmetrically on either side of a plane parallel to the elongated axis of the beam, and wherein the plane of each flange is parallel to the longitudinal direction of the beam, and that in each flange is configured a cut-out with a cross-section in the plane of the flange; and the opposite end of the upper longitudinal sub-beam member is provided with a second beam end whereon is arranged a second interconnection unit consisting of a second flange with the plane of the second flange in the longitudinal direction of the beam, wherein the width of the second flange across the plane of the second flange is smaller than or equal to x, and where substantially perpendicular to the plane of the second flange, a connecting element protrudes on each side of the second flange, wherein the cross-section of the connecting element in the plane of the second flange allows insertion of the connecting element into cut-outs of first flanges on a first beam end of a corresponding beam.

6. The beam section according to claim 5, wherein the lower longitudinal beam members ends are provided with flanges extending in the longitudinal direction of the lower longitudinal beam, where the flanges are provided with apertures, such that in use when beam sections are assembled into longer beams the apertures in two adjacent beam ends may be overlapped and a bolt inserted through the overlapping apertures, connecting two adjacent beam sections.

7. The beam section according to claim 5, wherein a plurality of lattice members are fastened between the upper longitudinal sub-beam member and the lower longitudinal sub-beam member.

8. A method of assembling two beam ends, where in the beam ends to be connected, coupling devices according to claim 3 is provided, and wherein a first beam end is swung relative to the beam end with which it is to be assembled, so that their longitudinal axes form an angle $\beta$ in a plane parallel to the plane of the flanges, whereafter the connecting element is inserted into the cut-outs, so that the second flange is inserted between the first parallel flanges, whereafter the beams are swung so that their longitudinal axes form a substantially straight line, whereby the connecting element locks releasably in the cut-out.

9. A method of assembling two beam ends, wherein the beam ends to be connected, coupling devices according to claim 1 is provided, and wherein a first beam end is swung relative to the beam end with which it is to be assembled, so that their longitudinal axes form an angle $\beta$ in a plane parallel to the plane of the flanges, whereafter the connecting element is inserted into the cut-outs, so that the second flange is inserted between the first parallel flanges, whereafter the beams are swung so that their longitudinal axes form a substantially straight line.

\* \* \* \* \*